July 27, 1943.   T. W. PAUL   2,325,271
COUPLER
Filed May 8, 1941
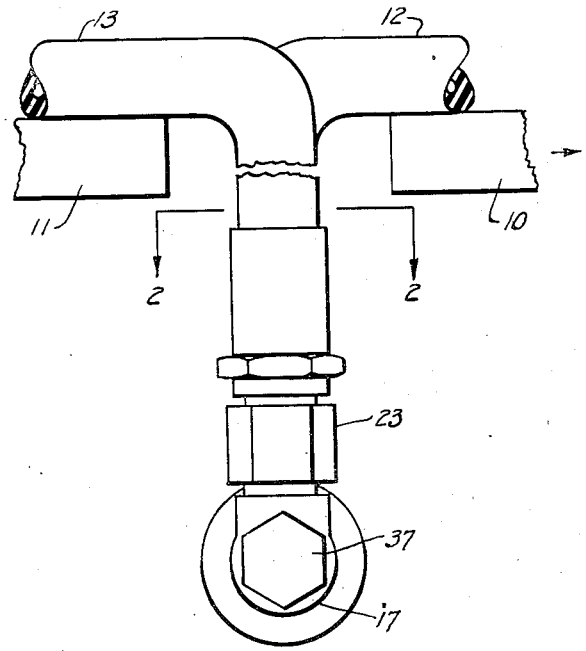
-Fig. 1-
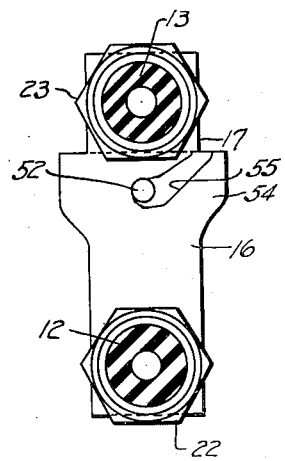
-Fig. 2-
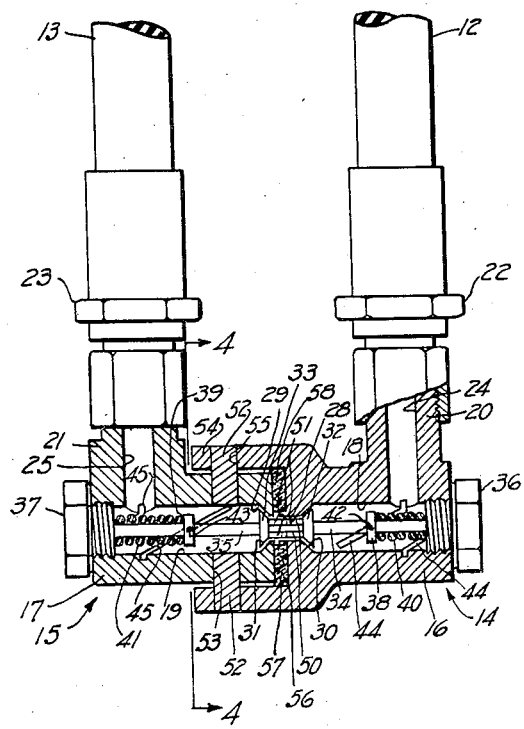
-Fig. 3-
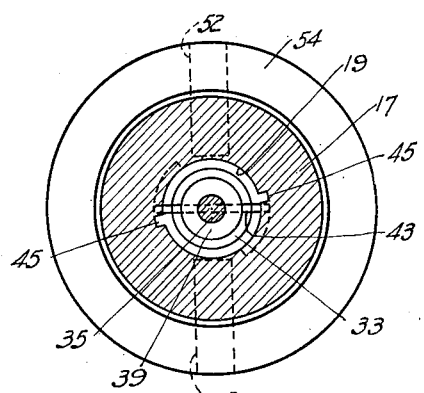
-Fig. 4-
TALBERT W. PAUL - INVENTOR.

Patented July 27, 1943

2,325,271

UNITED STATES PATENT OFFICE 2,325,271

COUPLER

Talbert W. Paul, Moline, Ill., assignor to Deere & Company, Moline, Ill., a corporation of Illinois Application May 8, 1941, Serial No. 392,453

3 Claims. (Cl. 284—4)

The present application relates generally to couplers and more particularly to couplers of the type adapted for quickly coupling and uncoupling a pair of hoses used for conducting fluid. Although I do not intend my invention to be limited to any particular embodiment or application, the principal object of my invention is to provide a means for releasably connecting fluid conduits on a pair of coupled mobile units, such as for example, a tractor having a hydraulic power lift mechanism, with a hydraulic lifting cylinder on a drawn implement, such as a plow. Some agricultural implements, such as plows, are generally connected to the tractor by means of a spring release hitch, which is adapted to release the plow from the tractor when the plow share encounters an immovable obstruction such as a buried rock. If such an implement were to be provided with a hydraulic cylinder operable from the power lift mechanism of a tractor for raising and lowering the plow between operating and transport position, it would be inadvisable to connect the power lift cylinder on the plow directly with the hydraulic mechanism on the tractor by means of a unitary flexible hose, for the reason that when the plow is released from the tractor, the hose would probably be broken and the oil or other liquid used as the power transmitting medium would be discharged upon the ground. Therefore, it is a more specific object of my invention to provide a coupling device which will automatically separate when the mobile units, such as the tractor and plow, are separated and which is provided with valve means for automatically closing the separated ends of the fluid conduits to prevent discharge of the fluid contained therein.

In the accomplishment of these objects I have provided a pair of cooperable coupling members, which can be coupled together by a relative angular movement of appreciably less than 180 degrees so that when the mobile units are separated, the coupling units are readily uncoupled. Each of the couplers is provided with a normally closed valve member, the valve members having interengaging parts when the couplers are coupled together, to hold the two valves open but which are provided with springs for quickly closing the valves when the couplers are separated.

These and other objects and advantages of my invention will be apparent to those skilled in the art after a consideration of the following description in which reference is had to the drawing appended hereto, in which Figure 1 is a side elevational view of a coupling device embodying the principles of the present invention, shown in a coupled position connecting a pair of hoses depending from a pair of coupled mobile units;

Figure 2 is a top plan view of the coupling device, taken along a line 2—2 in Figure 1;

Figure 3 is an elevational view partly in section, showing the details of construction of the coupling device, the latter being shown in a coupled position; and Figure 4 is a sectional view taken along a line 4—4 in Figure 3.

Referring now to the drawing, the two mobile units such as, for example, a tractor and a trailing implement, are represented by a pair of frame members 10, 11, respectively. The tractor and trailer 10, 11 are detachably connected together by any suitable draft device (not shown), and each of the mobile units is provided with a hydraulic mechanism, the coupling together of which is the subject of the present invention. A pair of flexible hoses 12, 13 are mounted on the tractor and trailer 10, 11, respectively, and are connected in communication with the fluid conduits on each of the units, respectively. The flexible hoses 12, 13 hang substantially vertically between the two coupled units 10, 11 and the lower ends of the hoses 12, 13 are detachably coupled in communication with each other by means of a pair of interengageable couplers 14, 15, respectively.

Each of the couplers 14, 15 comprises a generally cylindrical casing 16, 17, within which are disposed valve chambers 18, 19. The casings 16, 17 are disposed in a substantially horizontal position and have upwardly extending threaded necks 20, 21 to which the hoses 12, 13 are secured by suitable fittings 22, 23, respectively. Each of the necks 20, 21 is provided with a vertically extending duct 24, 25 disposed in communication with the valve chambers 18, 19, respectively. Each of the valve chambers 18, 19 is in the form of a cylindrical bore extending inwardly from the outer end of the coupler and having an inwardly tapering valve seat portion 30, 31 and intercommunicating openings 28, 29 of reduced diameter adjacent the inner end of each of the couplers 14, 15, respectively. A pair of poppet valves 32, 33 are normally seated in the seats 30, 31, respectively, for closing the communicating openings between the two valve chambers 18, 19. Each of the poppet valves 32, 33 is rigidly mounted on a stem 34, 35, respectively, which extends outwardly therefrom and is slidably supported at its outer end in a suitable recess provided in a plug member 36, 37, which screws into the outer end of the valve chamber, forming a closure therefor. The valve stems 34, 35 are provided with a pair of collars 38, 39, rigidly fixed thereto intermediate the ends thereof. The collars 38, 39 serve as abutments for a pair of compression springs 40, 41, which encircle the valve stems and react against the plugs 36, 37 and thus urge the poppet valves 32, 33 into receiving engagement with the valve seats 30, 31, respectively. The collars 38, 39 are fixed to the valve stems 34, 35 by means of pins 42, 43, respectively, which extend transversely through aligned apertures in the collars and valve stems and project radially outwardly on each side of the collars 38, 39. The opposite ends of the pins 42, 43 are slidably received within helical grooves 44, 45 disposed in the walls of the cylindrical valve chambers 18, 19, respectively. Thus it is clear to those skilled in the art that by virtue of the sliding action of the pins 42, 43 within the grooves 44, 45, a rotation of the valves about their major axes will cause them to move axially within the valve chambers, toward or away from the valve seats 30, 31. This relative angular movement between the valves and their respective chambers is provided by means for holding the two valves 32, 33 against rotation with respect to each other when the couplers 14, 15 are moved angularly about the common axis of the couplers and valves at the time the couplers are connected and disconnected. The valves are interengaged by a pair of axially extending lugs 50 extending inwardly from the face of the valve 32 and adapted to engage a similar pair of lugs 51 extending inwardly from the inner face of the poppet valve 33. The axial grooves 44, 45 are in the form of right and left hand helices so that when the couplers 14, 15 are moved angularly in opposite directions to couple the same together, the valves 32, 33 are moved outwardly in opposite directions from the valve seats 30, 31 against the action of the coil springs 40, 41, respectively.

The two coupler cases 16, 17 are also locked together by virtue of the relative angular movement during the coupling operation, by means of a pair of radially outwardly extending pins 52 rigidly fixed to the coupler casing 17 by any suitable means, such as by driving them tightly within a pair of oppositely disposed apertures 53 in the coupler casing 17. The coupler casing 16 is provided with an axially extending flange 54, providing a socket to receive the coupler casing 17 in telescoping relation and the flange 54 is provided with a pair of helically extending slots 55 at diametrically opposite positions in the flange and adapted to receive the pins 52 and to act as camming means for drawing the two couplers 14, 15 together when the latter are moved angularly relative to each other through an angle of less than 180 degrees and preferably in the order of about 45 degrees.

The two couplers 14, 15 are provided with a pair of abutting surfaces 56, 57 between which is clamped an annular gasket 58 of suitable sealing material to insure that no leakage of fluid takes place between the two couples when in coupled relation.

Before the couplers are coupled together, the valves are held tightly closed by the springs 40, 41 combined with any fluid pressure which may be within the valve chambers 18, 19. The couplers are coupled together by first twisting the hoses 12, 13 until the coupling pins 52 enter the slots 55 in the flange 54. The couplers are then rotated in relatively opposite directions to move the pins 52 into the slots 55, during which angular movement the two coupler cases 16, 17 are clamped together by the camming action of the pins 52 in the slots 55. At the same time, the lugs 50, 51 on the two valves interengage and hold the valves against relative angular movement, whereupon the angular movement between the valves and the two cases 16, 17 causes the valves to be moved axially away from the seats 30, 31 in opposite directions, due to the camming action of the pins 42, 43 in the slots 44, 45, respectively. Inasmuch as the axis of rotation of the couplers is disposed generally transversely relative to the line of advance of the mobile units 10, 11, when the latter tends to move apart the couplers are rotated in opposite directions by forces applied to the two hoses 12, 13, and thus uncoupling the couplers, causing the latter to fall apart. The valves 32, 33 are immediately closed by the action of the springs 40, 41 to prevent loss of fluid.

I do not intend my invention to be limited to the exact details shown and described herein except as set forth in the claims which follow.

I claim:

1. Apparatus for releasably connecting fluid conduits on a pair of coupled mobile units, comprising in combination, a pair of flexible hoses connected with and depending from said conduits, couplers attached to said hoses and having helical interengaging surfaces adapted to draw said couplers together in fluid-tight relation when the latter are relatively moved in coupling engagement through an angle of appreciably less than 180 degrees and to automatically uncouple when said mobile units are separated to pull said hoses apart, means for sealing the joint between said couplers, a pair of valve closure members rotatably disposed on a common axis in said couplers, respectively, said members being movable into and out of closed position for interrupting the flow of fluid between said couplers and having projections extending outwardly from the axis of rotation and jaws adapted to interengage when said couplers are coupled, said couplers being provided with internal helical grooves adapted to slidably receive said projections, whereby relative angular movement of said couplers with said valves interengaged rotates both valves in said grooves and moves both valves to open position.

2. Apparatus for releasably connecting fluid conduits on a pair of coupled mobile units, comprising in combination, a pair of flexible hoses connected with and depending from said conduits, couplers attached to said hoses and having helical interengaging surfaces adapted to draw said couplers together in fluid-tight relation when the latter are relatively moved in coupling engagement through an angle of appreciably less than 180 degrees and to automatically uncouple when said mobile units are separated to pull said hoses apart, means for sealing the joint between said couplers, a pair of valve closure members in said couplers, respectively, said members being movable into and out of closed position for interrupting the flow of fluid between said couplers and having interengageable parts to hold said valve members against relative angular movement during relative angular coupling movement of said couplers, and camming means between each of said valve members and its respective coupler for moving the valves out of closed position responsive to angular movement of each coupler relative to its corresponding valve member during coupling movement.

3. Apparatus for releasably connecting fluid conduits on a pair of coupled mobile units, comprising in combination, a pair of flexible hoses connected with and depending from said conduits, couplers attached to said hoses and having helical interengaging surfaces adapted to draw said couplers together in fluid-tight relation when the latter are relatively moved in coupling engagement through an angle of appreciably less than 180 degrees and to automatically uncouple when said mobile units are separated to pull said hoses apart, a poppet valve in each of said couplers, each valve being rotatably mounted on the axis of angular coupling movement of said couplers and movable axially between open and closed positions, said valves having interengageable parts to hold them against relative rotation during relative angular coupling movement of said couplers, and camming means between each of said valves and its associated coupler for moving the valves axially to open position responsive to angular movement of the couplers relative to the valves during coupling movement.

TALBERT W. PAUL.